(12) United States Patent
Mohlman et al.

(10) Patent No.: US 11,232,887 B2
(45) Date of Patent: Jan. 25, 2022

(54) METHOD FOR ASSEMBLING AND INSTALLING A WIRE BUNDLE ASSEMBLY GROUP

(71) Applicant: The Boeing Company, Chicago, IL (US)

(72) Inventors: Shawn D. Mohlman, Mill Creek, WA (US); Bret H. Livingston, Camano, WA (US); Tinh V. Truong, Everett, WA (US); Lars E. Blacken, Bothell, WA (US)

(73) Assignee: The Boeing Company, Chicago,, IL (US)

( * ) Notice: Subject to any disclaimer, the term of this patent is extended or adjusted under 35 U.S.C. 154(b) by 162 days.

(21) Appl. No.: 16/117,721

(22) Filed: Aug. 30, 2018

(65) Prior Publication Data

US 2019/0027279 A1 Jan. 24, 2019

Related U.S. Application Data

(62) Division of application No. 14/734,599, filed on Jun. 9, 2015, now Pat. No. 10,096,405.

(51) Int. Cl.
*H01B 13/012* (2006.01)
*H01R 43/28* (2006.01)
(Continued)

(52) U.S. Cl.
CPC ....... *H01B 13/01236* (2013.01); *B62B 1/264* (2013.01); *B65H 49/00* (2013.01);
(Continued)

(58) Field of Classification Search
CPC ................ H01B 13/012; H01B 13/01236; H01R 43/18; H01R 43/20; H01R 43/23;
(Continued)

(56) References Cited

U.S. PATENT DOCUMENTS

| 3,990,653 A | 11/1976 | Marcel |
| 4,443,284 A | 4/1984 | Bandurski |

(Continued)

FOREIGN PATENT DOCUMENTS

| EP | 2575147 A2 | 4/2013 |
| JP | 2015011908 A | 1/2015 |

OTHER PUBLICATIONS

Piquet, Bruno; Airbus Technical Magazine #53, FAST (Flight Airworthiness Support Technology), Jan. 2014; Airbus 2014; pp. 1-40; ISSN 1293-5476.

(Continued)

*Primary Examiner* — A. Dexter Tugbang

(57) ABSTRACT

A method for assembling and installing a wire bundle assembly group (WBAG) is disclosed. The method includes placing a first grouping of components of a first WBAG on a first assembly panel of a fabrication table. The method also includes assembling the first WBAG from the first grouping of components and attaching the first WBAG to the first assembly panel. The method also includes actuating a pivot of an assembly frame supporting the first assembly panel to rotate the first assembly panel about a longitudinal axis. The method further includes placing a WBAG receiving panel of a transport tool adjacent the first WBAG and the first assembly panel. The method also includes releasing the first WBAG from the first assembly panel and dropping the WBAG onto the WBAG receiving panel. Finally, the method includes attaching the first WBAG to the WBAG receiving panel.

20 Claims, 13 Drawing Sheets

(51) Int. Cl.
*B62B 1/26* (2006.01)
*B65H 49/00* (2006.01)
*B65H 49/32* (2006.01)
*B62B 3/10* (2006.01)
*B65H 49/38* (2006.01)
*H01R 43/18* (2006.01)
*H01R 43/20* (2006.01)

(52) U.S. Cl.
CPC ........... *B65H 49/32* (2013.01); *H01B 13/012* (2013.01); *B62B 3/10* (2013.01); *B65H 49/38* (2013.01); *B65H 2701/36* (2013.01); *H01R 43/18* (2013.01); *H01R 43/20* (2013.01); *H01R 43/28* (2013.01); *Y10T 29/53252* (2015.01); *Y10T 29/53265* (2015.01)

(58) Field of Classification Search
CPC ........ H01R 43/28; B65H 49/00; B65H 49/32; B65H 49/38; B65H 2701/86; B62B 1/264; B62B 3/10; Y10T 29/53252; Y10T 29/53265
See application file for complete search history.

(56) References Cited

U.S. PATENT DOCUMENTS

| | | | |
|---|---|---|---|
| 4,970,778 A | 11/1990 | Den Otter | |
| 5,509,671 A | 4/1996 | Campbell | |
| 6,059,220 A | 5/2000 | Lassiter | |
| 6,364,331 B1 | 4/2002 | Yap | |
| 6,498,297 B2 | 12/2002 | Samhammer | |
| D584,471 S | 1/2009 | Diedericks | |
| 2003/0196320 A1* | 10/2003 | Ikeda | H01R 43/28 29/749 |
| 2013/0341455 A1 | 12/2013 | Worton | |

OTHER PUBLICATIONS

EP, Extended European Search Report; Patent Application No. EP 16173669.9 (dated Oct. 5, 2 016).

* cited by examiner

US 11,232,887 B2

METHOD FOR ASSEMBLING AND INSTALLING A WIRE BUNDLE ASSEMBLY GROUP

RELATED APPLICATIONS

This application is a divisional of U.S. application Ser. No. 14/734,599 filed on Jun. 9, 2015, the entirety of which is hereby incorporated by reference.

TECHNICAL FIELD

The disclosure relates to methods and systems for assembling and installing wire bundle assemblies and, more particularly, to methods and systems for assembling wiring bundle assemblies and installing the wiring bundle assemblies into aircraft and other vehicles.

BACKGROUND

Vehicles, such as large aircraft, have complex electrical and electromechanical systems distributed throughout the fuselage, hull, and other components of the vehicle. Such electrical and electromechanical systems require many bundles of wire, cables, connectors, and related fittings to connect the various electrical and electromechanical components of the vehicle. For example, a large aircraft may have over 1000 discrete wire bundles. Often these discrete wire bundles are grouped into assemblies known as wire bundle assembly groups (WBAGs), which may comprise as many as 40 wire bundles and 1000 wires. Individual WBAGs may exceed 90 feet in length. Because of their size, such WBAGs typically are assembled outside of the aircraft, and frequently are assembled in a location remote from the aircraft fuselage in which the wire bundle is to be installed.

Each phase of the fabrication, transportation, and installation of a WBAG in a fuselage requires many man-hours of manual labor. Once the WBAG, which also may be known as a family group, is assembled, it must be transported from the assembly area and installed within the partially completed fuselage of the aircraft for which it was designed. An assembled WBAG is transported from the assembly area to transportation, if needed, such as by truck, to the installation area. At the installation area, the WBAG is manually removed from the transportation and manually carried into the aircraft fuselage.

Long and heavy WBAGs may require a line of as many as 20 installers, each carrying the WBAG over his or her shoulder. Alternatively, the WBAG may be wound on a spool and transported to the installation site. Regardless of the method, at the installation site, the installers snake the WBAG into the fuselage of the aircraft, where it is attached manually to the aircraft, frequently onto the beams comprising the cargo ceiling of the aircraft. Each installer may need to carry as much as 50-70 pounds on their shoulder while carrying the assembled WBAG into the fuselage for attachment. This transportation by the installers may require them to walk up and down stairways, and across a temporary flooring into the fuselage, all while carrying the WBAG on their shoulders.

Accordingly, there is a need for a method and system for assembling and installing a WBAG, that minimizes manual labor and expedites the installation process.

SUMMARY

In an embodiment, a method for assembling and installing a wire bundle assembly (WBAG) is disclosed. The method includes placing a first grouping of components of a first WBAG on a first assembly panel of a fabrication table. The method also includes assembling the first WBAG from the first grouping of components and attaching the first WBAG to the first assembly panel. The method further includes actuating a pivot of an assembly frame supporting the first assembly panel to rotate the first assembly panel about a longitudinal axis. The method also includes placing a WBAG receiving panel of a transport tool adjacent the first WBAG and the first assembly panel and releasing the first WBAG from the first assembly panel to fall onto the WBAG receiving panel. Finally, the method includes attaching the first WBAG to the WBAG receiving panel.

In another embodiment, a method for assembling and installing a wire bundle assembly group WBAG is disclosed. The method includes receiving and supporting a first WBAG by a first assembly panel and receiving and supporting a second WBAG by a second assembly panel. The first WBAG, the first assembly panel, the second WBAG, and the second assembly panel are part of a fabrication table. The method also includes connecting the first assembly panel to the second assembly panel by an adjustable pivot of an assembly frame. The first assembly panel and the second assembly panel are in a spaced orientation relative to each other and pivot about an axis parallel to a longitudinal dimension of the first assembly panel and the second assembly panel. The method also includes receiving and supporting an assembled WBAG from the fabrication table by a WBAG receiving panel. The method further includes connecting the WBAG receiving panel to an adjustable support of a transport frame. The WBAG receiving panel and the transport frame are both part of a transport tool. The method also includes positioning the transport frame adjacent the fabrication table to locate the WBAG receiving panel beneath the first assembly panel and the second assembly panel. Finally, the method includes dropping the assembled WBAG downwardly onto the WBAG receiving panel from the fabrication table.

Other objects and advantages of the disclosed method and system for assembling and installing a wire bundle will be apparent from the following description, the accompanying drawings, and the appended claims.

DETAILED DESCRIPTION

Figure 1:
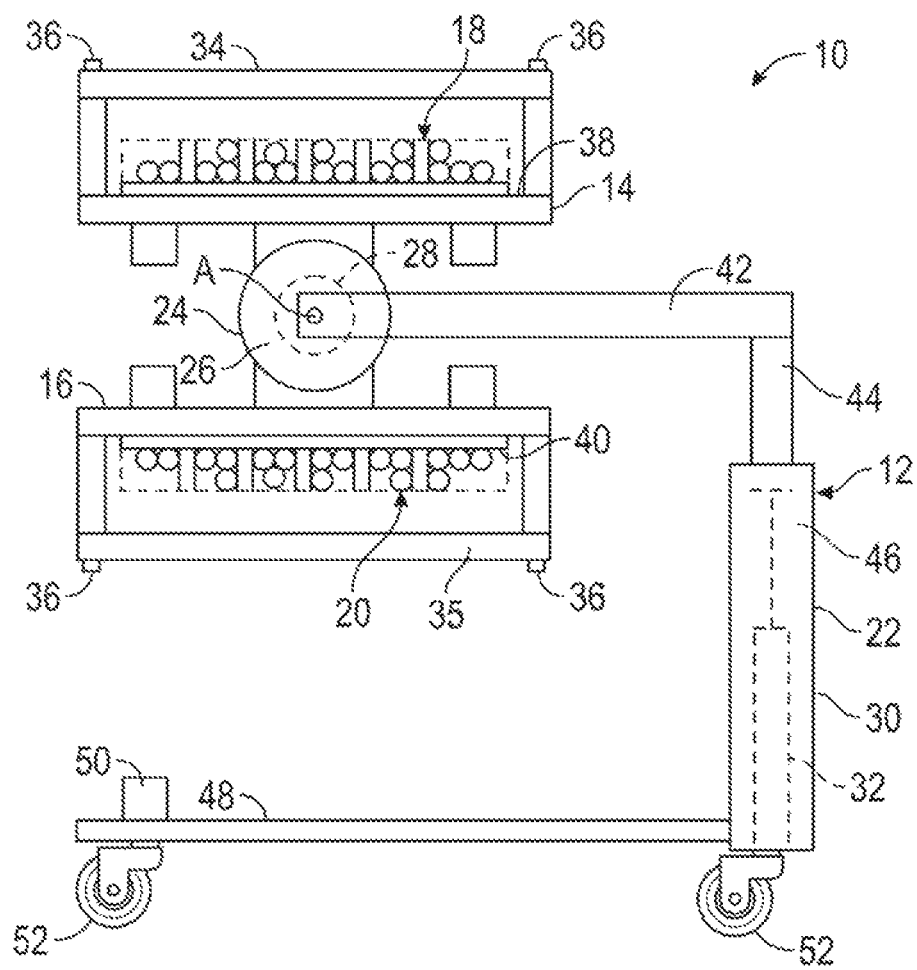
FIG. 1 is a diagrammatic representation of a side elevation of a fabrication table of an embodiment of the disclosed system for assembling and installing a WBAG.
Figure 2:
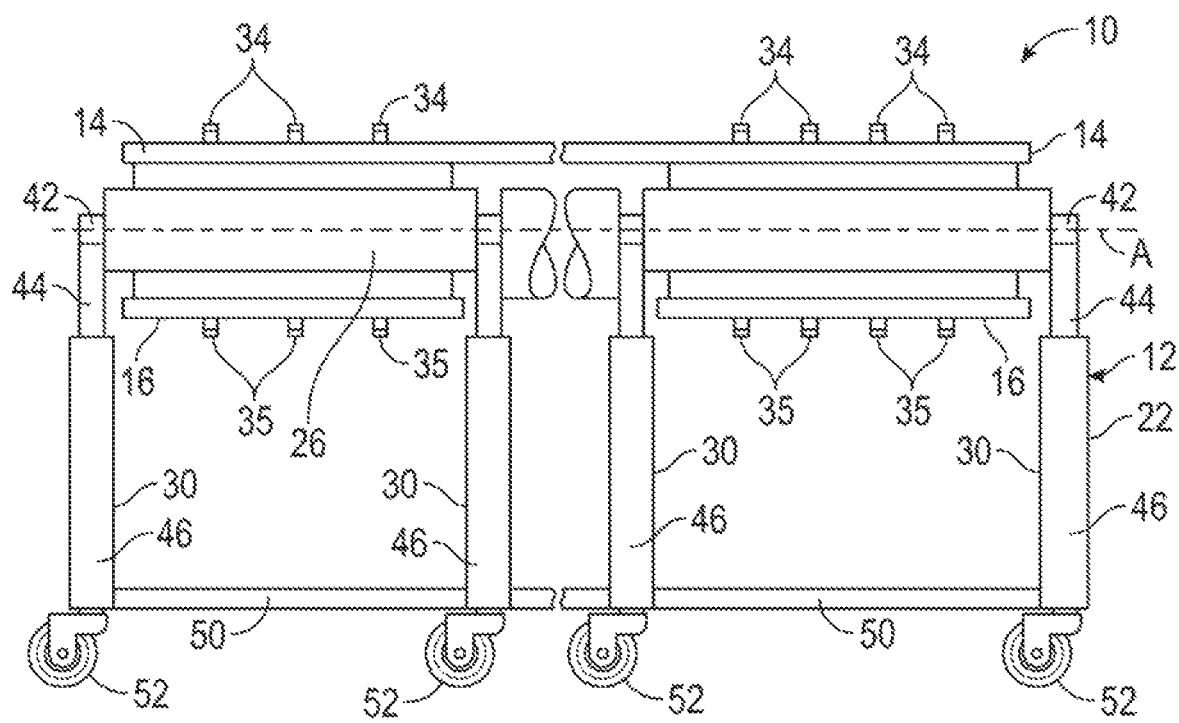
FIG. 2 is a diagrammatic representation of a front elevation, partially broken away, of the fabrication table of FIG. 1.
Figure 3:
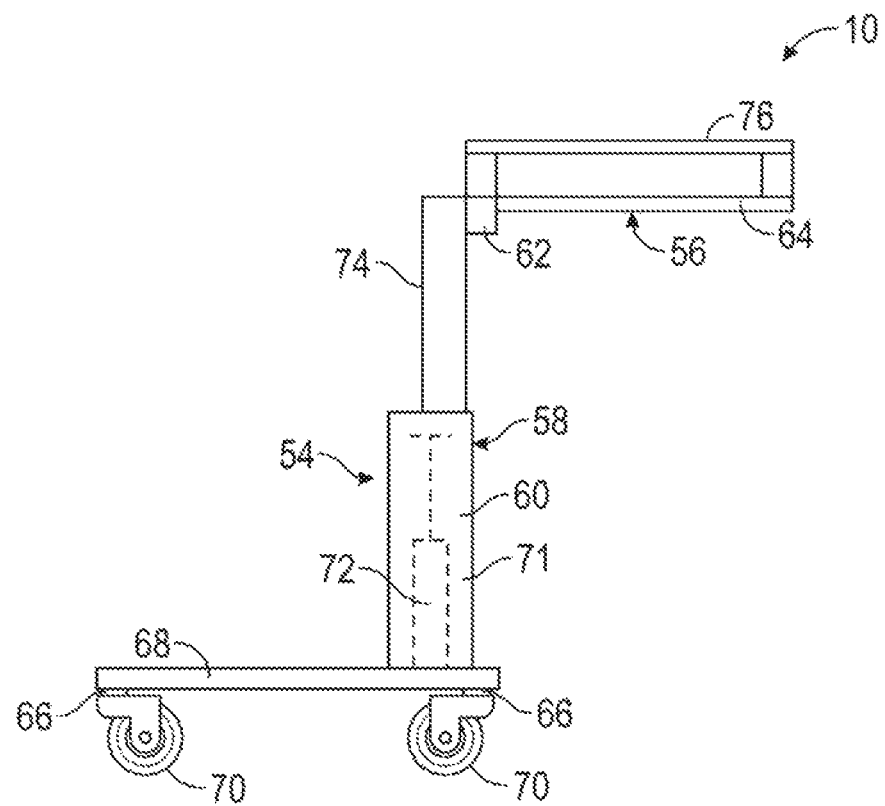
FIG. 3 is a diagrammatic representation of a side elevation of a transport frame of the embodiment of the system of FIGS. 1 and 2.

FIGS. 1, 2 and 3 illustrate an embodiment of the disclosed system for assembling and installing a wire bundle assembly group, or WBAG, generally designated 10. While the disclosed system 10 and method are described with reference to assembling and installing a WBAG, the system and method may be employed to assemble and install other forms and types of wire bundles and wiring harnesses.

A wire bundle may contain from 1 to over 100 individual wires, which may be of different gages and types. The wires of a wire bundle may be held together by cable ties or tie-wraps, also known as zip ties, as well as string ties. A wire bundle also may include connectors common to the wires. A WBAG may contain as many as 40 wire bundles and over 1000 wires. Individual wire bundles may be fabricated prior to inclusion in a WBAG. The wire bundles of a WBAG may be held together by clamping provisions, which may hold 8 or more wire bundles together. Clamping provisions may include P-clamps and wire harness assembly mount supports, also known as "tombstones."

The system 10 may include a fabrication table 12 having a first assembly panel 14 and a second assembly panel 16. The first and second assembly panels 14, 16 each may be planar and elongate. In an embodiment, the assembly panels 14, 16 each may be as long as 90 feet and may be 30 inches wide, although the dimensions may be dictated by the types of WBAGs to be assembled. The first assembly panel 14 may be shaped to receive and support a first WBAG 18, and the second assembly panel 16 may be shaped to receive a second WBAG 20.

The fabrication table may include an assembly frame 22 having an adjustable pivot 24. The adjustable pivot 24 may be attached to the first assembly panel 14 and a second assembly panel 16 such that the first and second assembly panels are held in a spaced orientation relative to each other, and the first and second assembly panels pivot about an axis A that is parallel to a longitudinal dimension of the first and second assembly panels.

In an embodiment, the adjustable pivot 24 may include a central shaft 26 rotated by an actuator 28, which may take the form of an electric motor or a hydraulic motor, wherein the central shaft may be a continuous shaft rotatably mounted on the assembly frame 22, or as shown in FIG. 2, may be a segmented shaft rotatably mounted on the assembly frame. With either configuration, the actuator 28 may selectively rotate the central shaft 26 to rotate the first assembly panel 14 and the second assembly panel 16 at least 180° about axis A. With the configuration in which the central shaft 26 is a continuous shaft, the actuator 28 may be able to cause the adjustable pivot 24 to rotate the first and second assembly panels 14, 16 at least 360°.

In an embodiment, the assembly frame 22 is height adjustable. The assembly frame 22 may include adjustable supports 30 and an actuator 32 that raises and lowers the adjustable pivot 24, the first assembly panel 14 and the second assembly panel 16 relative to a remainder of the assembly frame 22. The actuator 32 may be selected from a hydraulic telescoping cylinder, a pneumatic telescoping cylinder, and a screw actuator. In an embodiment, the assembly frame 22 may hold the first assembly panel 14 and the second assembly panel 16 parallel to each other so that the adjustable pivot 24 may pivot the first assembly panel 14 selectively to be superposed (i.e., positioned directly above along its length) to the second assembly panel 16, and pivot the second assembly panel selectively to be superposed to the first assembly panel.

In an embodiment, the fabrication table 12 may include a bundle-retaining element that may take the form of a plurality of retention bars 34 spaced along the length of the first assembly panel 14, and a plurality of retention bars 35 spaced along the length of the second assembly panel 16. The retention bars 34, 35 may be releasably attachable to the first and second assembly panels 14, 16 by quick release pins 36 so that the WBAG 18 may be captured between the retention bars 34 and the first assembly panel 14, and the WBAG 20 may be captured between the retention bars 35 and the second assembly panel 16. In an embodiment, the retention bars 34, 35 may take the form of spanner bars that are releasably attachable to the assembly panels 14, 16, and to the fuselage of an aircraft. The first assembly panel 14 may have a first WBAG supporting surface 38, and the second assembly panel 16 may have a second WBAG bundle supporting surface 40, such that when one of the first WBAG supporting surface and the second WBAG supporting surface faces upwardly, the other one of the first and second WBAG supporting surfaces faces downwardly.

As shown in FIG. 2, the assembly frame 22 may include a plurality of adjustable supports 30 along its length, with adjustable supports attached to opposite ends, or in embodiments end faces, of the central shaft 26. In an embodiment in which the adjustable pivot 24 takes the form of a continuous and unbroken central shaft 26, the plurality of adjustable supports 30 may include only the adjustable supports attached to the opposite ends of the single, continuous central shaft. One, some, or all of the plurality of adjustable supports 30 may have actuators 32 as shown in FIG. 1.

Each of the plurality of adjustable supports 30 may include a horizontal support arm 42 that is rotatably attached to the central shaft 26, and a vertical support arm 44. The vertical support arm 44 may telescope into an outer sleeve 46 so that the height of the first assembly panel 14 and second assembly panel 16 may be adjusted vertically by the actuator 32 (see FIG. 1). The assembly frame 22 also may include transverse stiffeners 48 (see FIG. 1), and longitudinal stiffeners 50 that are attached to the bases of the outer sleeves 46 of each adjustable support 30. The assembly frame 22 also may include wheel attachments 52, such as casters, that may be attached at the base of each adjustable support 30 so that the fabrication table 12 may be moveable and positionable.

Figure 4:
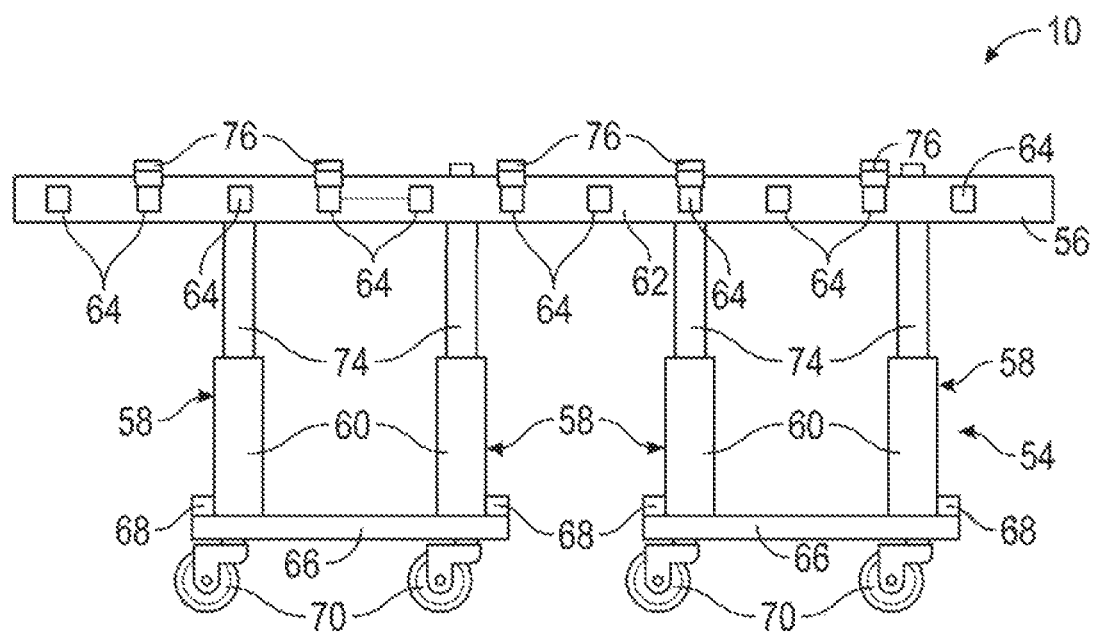
FIG. 4 is a diagrammatic representation of a front elevation of the transport frame of FIG. 3.
Figure 10:
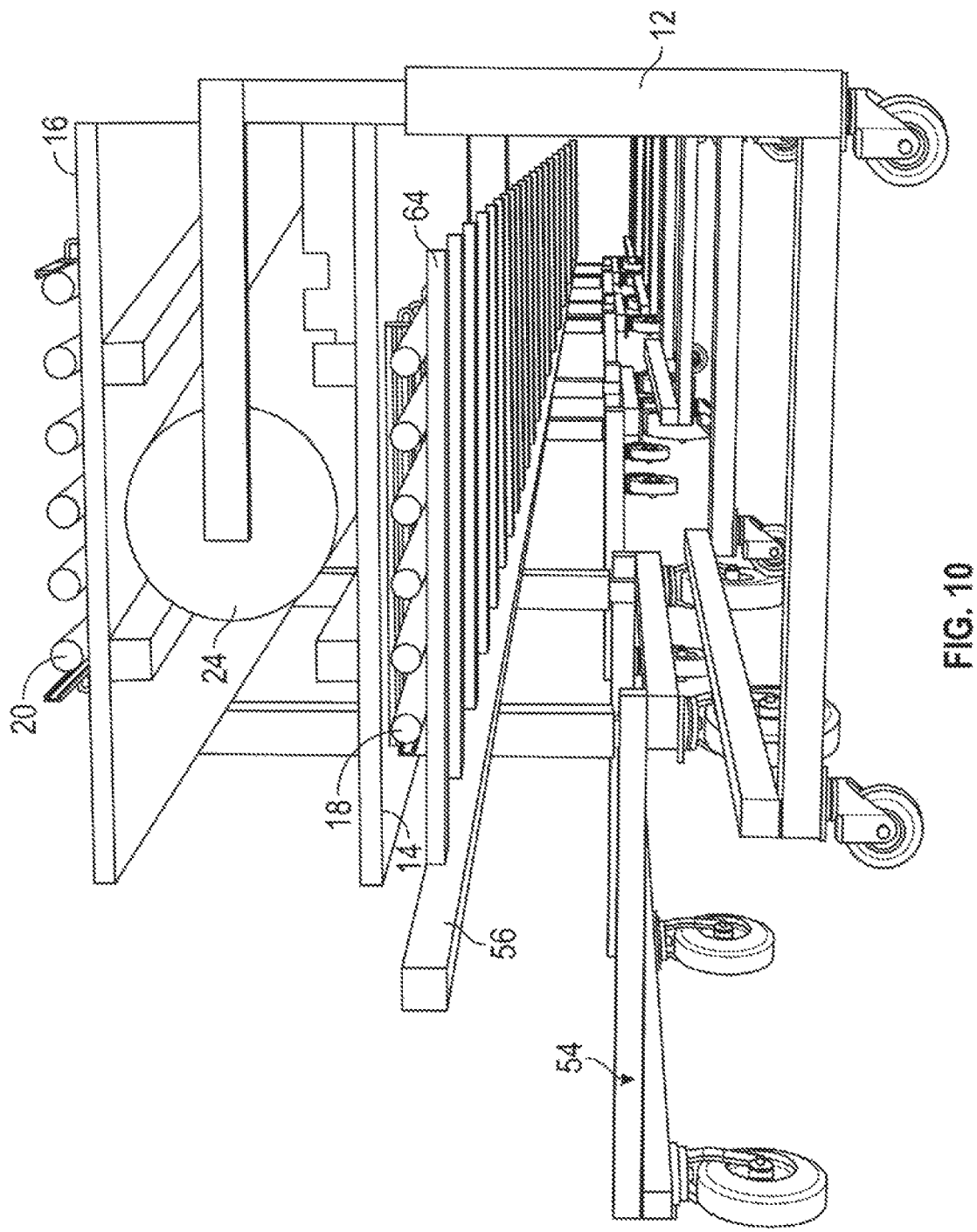
FIG. 10 is a diagrammatic representation of a perspective view of the fabrication table and transport frame of FIG. 8, in which the transport frame is positioned beneath the first and second assembly panels of the fabrication table.

As shown in FIGS. 3 and 4, the system 10 may include a transport tool, generally designated 54, having a WBAG receiving panel 56. The WBAG receiving panel 56 may be planar and elongate, and shaped to receive and support an assembled/completed WBAG from the fabrication table 12 (see FIGS. 1 and 2). The transport tool 54 also may include a transport frame 58 having a plurality of adjustable supports 60 connected to the WBAG receiving panel 56. The adjustable supports 60 may raise and lower the WBAG receiving panel 56 so that the transport frame 58 may be positionable adjacent the fabrication table 12. In one configuration, the WBAG receiving panel 56 may be located beneath the first assembly panel 14 and the second assembly panel 16, as shown in FIG. 10, whereby an assembled/completed WBAG 18, 20 may drop downwardly onto the WBAG receiving panel 56. Also as shown in FIG. 10, the transport tool 54 may be shaped to nest beneath the fabrication table 12.

With reference again to FIGS. 3 and 4, in an embodiment, the WBAG receiving panel 56 may include a rail 62 that extends longitudinally of the transport tool 54, and a plurality of support rods 64 that may be attached at their ends and extend laterally from the rail spaced along its length. The support rods 64 may be adapted to support a completed WBAG 18, 20 received from the fabrication table 12. The transport frame 58 may include longitudinal struts 66 and transverse struts 68 attached to and extending between the plurality of adjustable supports 60. Wheel attachments 70, such as casters, may be positioned at the base of each of the plurality of adjustable supports 60 so that the transport frame 58 may be moved into a nested position with respect to the fabrication table 12, as shown in FIG. 10, or transported for installation of the assembled WBAG 18, 20 into an aircraft, as will be described.

In an embodiment, each adjustable support 60 may include a base 71. One, some, or all of the bases 71 may enclose an actuator 72 that may selectively raise and lower the WBAG receiving panel 56 relative to a remainder of the transport tool 54. In embodiments, the actuator 72 may be selected from a hydraulic telescoping cylinder, a pneumatic telescoping cylinder, and a screw actuator. In embodiments, each adjustable support 60 may include an upper portion 74 that may telescope into the base 71. The upper portion 74 may be attached to the rail 62 of the WBAG receiving panel 56. As shown in FIG. 4, the transport tool 54 may include a plurality of adjustable supports 60, in which the upper portion 74 of each may be attached to the rail 62 of the WBAG receiving panel 56 along the length of the rail. Also in an embodiment, the WBAG receiving panel 56 may include retention bars 76 that may retain one of the completed WBAG 18, 20, received from the fabrication table 12 (FIGS. 1 and 2), against the support rods 64 of the WBAG receiving panel 56.

Figure 5:
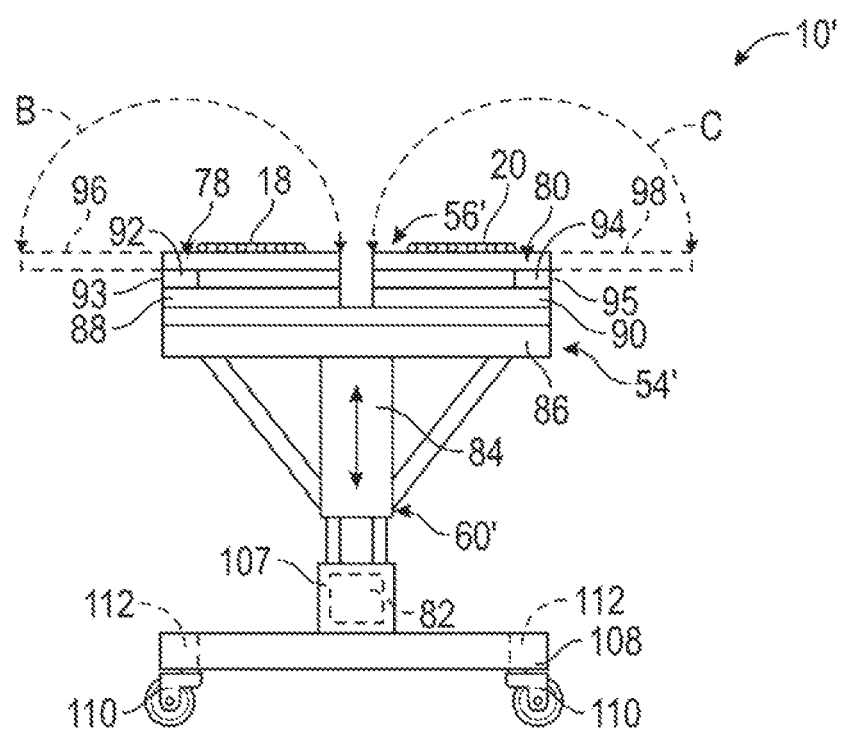
FIG. 5 is a diagrammatic representation of a side elevation of a transport tool of an alternate embodiment of the system for assembling and installing a WBAG.
Figure 6:
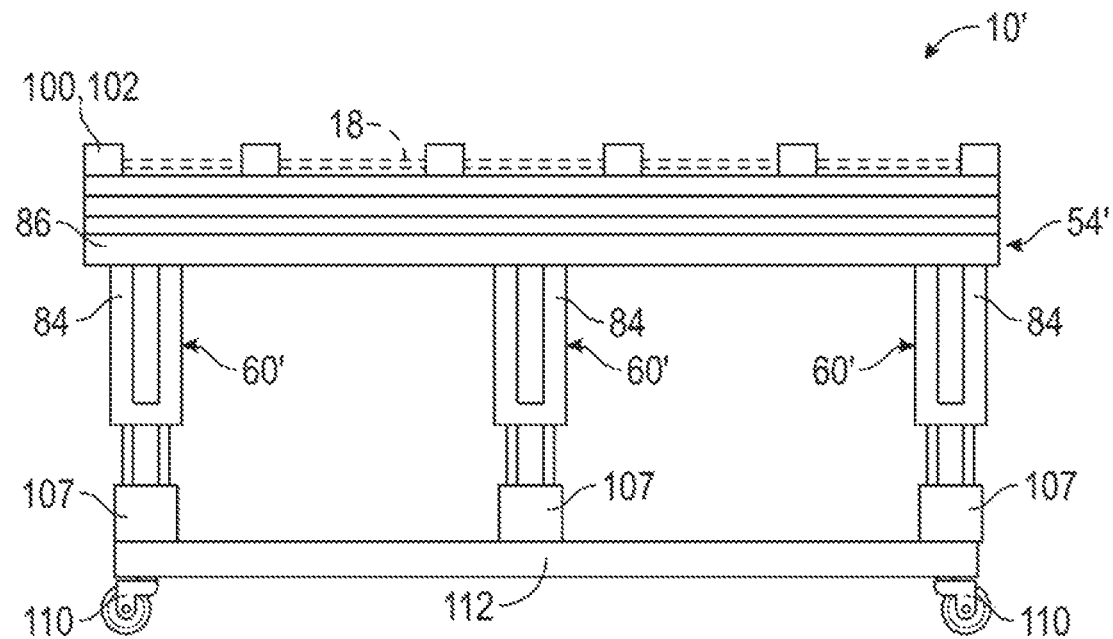
FIG. 6 is a diagrammatic representation of a front elevation of the transport tool of FIG. 5.
Figure 7:
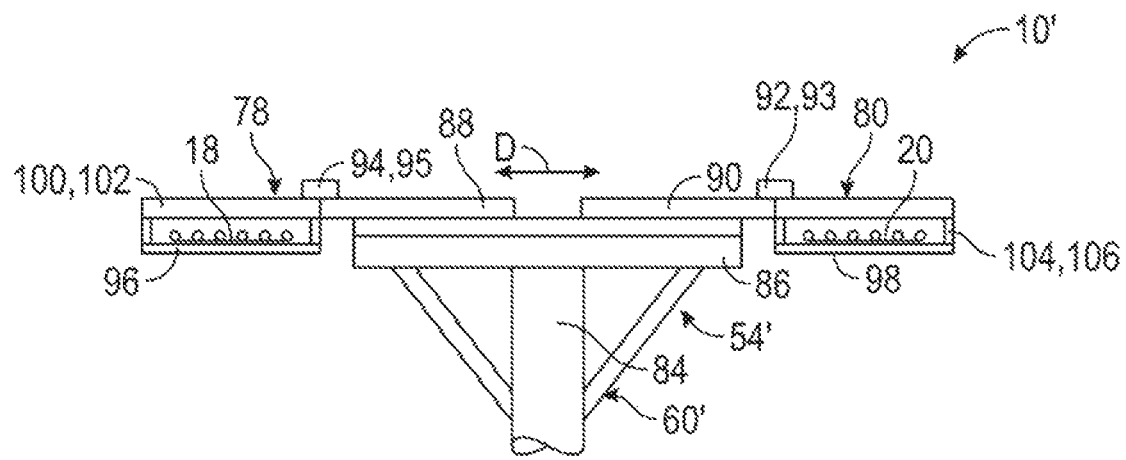
FIG. 7 is a diagrammatic representation of a detail of the transport tool of FIGS. 5 and 6, shown in a spread configuration.

An alternate embodiment of the transport tool 54' is shown in FIGS. 5, 6, and 7. In this embodiment, the WBAG receiving panel 56' may include a first rack 78 and a second rack 80, each connected to the transport tool 54' for pivotal movement and for horizontal, or substantially horizontal, slidable movement toward and away from each other. The transport tool 54' may include an actuator 82 for raising and lowering the first rack 78 and the second rack 80, wherein the actuator may be selected from a hydraulic telescoping cylinder, a pneumatic telescoping cylinder, and a screw actuator.

The adjustable support 60' may include an upper portion 84 that may be connected to a support plate 86. Slides 88, 90 may be mounted on support plate 86. Slide 88 may support the first rack 78, and the slide 90 may support the second rack 80. The first rack 78 may be connected to the slide 88 by a pivot 92, and the second rack 80 may be connected to the slide 90 by a pivot 94. Accordingly, the first rack 78 may be pivoted independently to the open position 96, and second rack 80 may be pivoted independently to the open position 98, shown in FIGS. 5 and 7. The first and second racks 78, 80 may be pivoted manually, or by actuators 93, 95, respectively, incorporated in the pivots 92, 94. Actuators 93, 95 may be hydraulic actuators, electric actuators, or pneumatic actuators that produce rotary motion.

Thus, first rack 78 may be pivoted along the path indicated by arrows B between an open position 96, shown in FIG. 7, and a closed position, shown in FIG. 5. Similarly, the second rack 80 may be pivoted along the direction of arrow C to the open position 98 shown in FIG. 7, and the closed position shown in FIG. 5. The slides 88, 90 may allow the first rack 78 and the second rack 80 to move toward and away from each other in the direction of arrows D in FIG. 7 so that the completed WBAGs 18, 20 supported by the first and second racks 78, 80 may be collected from a fabrication table 12 (see FIGS. 1 and 2) and rotated and translated into a selected position for attachment to an aircraft. The first rack 78 also may include a retention bar 100, and/or a spanner bar 102 to retain a finished WBAG 18 on the first rack 78. The second rack 80 also may include a retention bar 104 and/or a spanner bar 106 to retain a finished WBAG 20 on the second rack 80.

The adjustable support 60' may include a base 107 that encloses the actuator 82 and rests upon a support frame 108 that is in turn supported by casters 110 so that the transport tool 54' may be moved from an assembly area to an installation area. As shown in FIG. 6, the transport tool 54' may include a plurality of adjustable supports 60', connected by a horizontal support bar 112, and preferably a pair of spaced-apart support bars connected by the support frame 108, as shown in FIG. 5.

Figure 8:
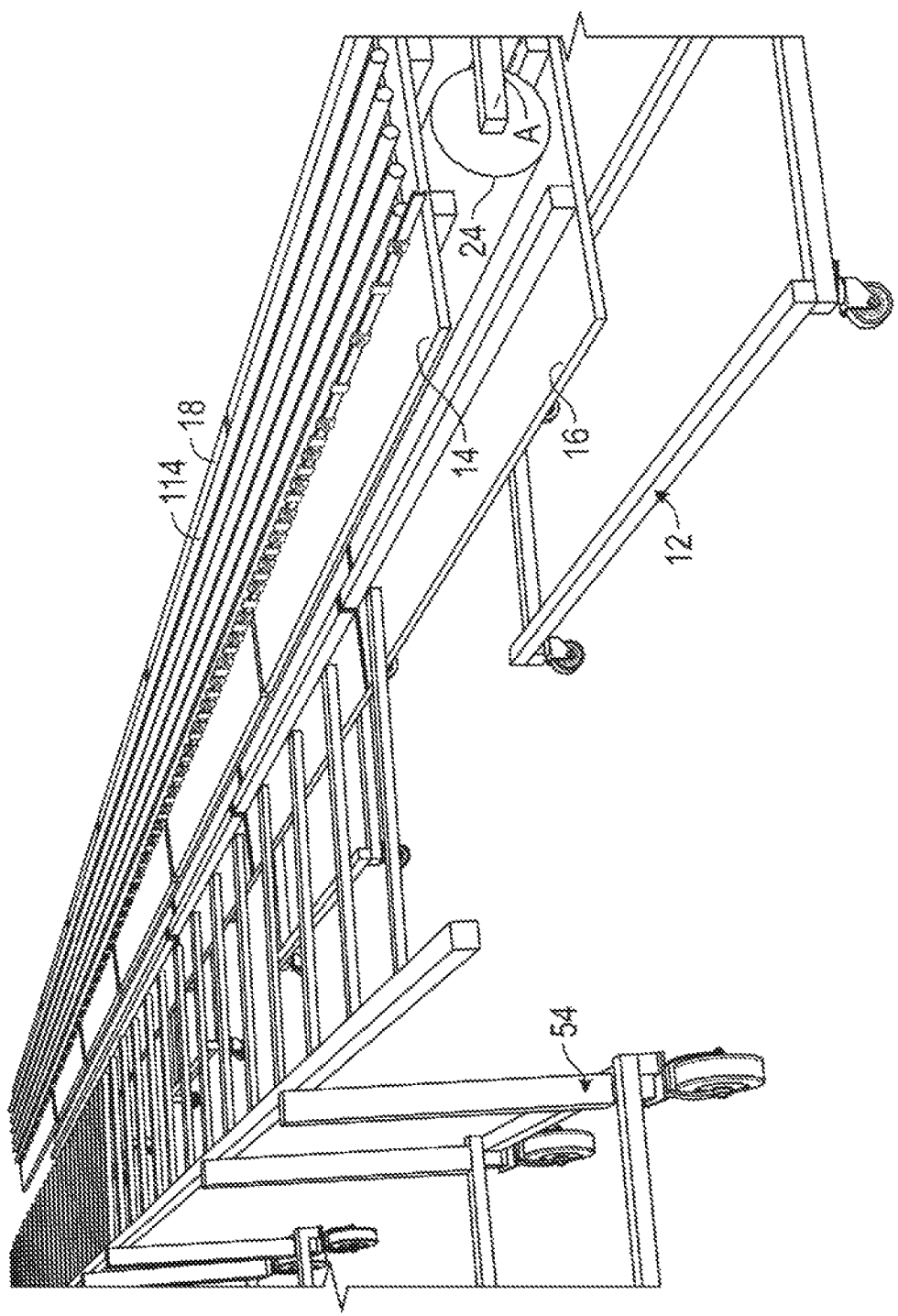
FIG. 8 is a diagrammatic representation of a perspective view of the embodiment of FIGS. 1-4, in which the fabrication table and transport frame are positioned adjacent each other.

The method of assembling and installing a WBAG 18, 20 using the system 10 of FIGS. 1-4 begins as shown in FIG. 8. Preliminarily, the actuator 32 (see FIG. 1) of the fabrication table 12 may be activated to raise or lower the first assembly panel 14 to a height convenient for human assemblers standing adjacent the fabrication table to assemble the WBAG 18. Optionally, the actuator 28 may be activated to position the first assembly panel 14 to a substantially horizontal orientation, as shown in FIGS. 1 and 2, or slightly tilt the first assembly panel to provide an ergonomically desired working surface 38 (see FIG. 1) to the assemblers.

A first grouping of components 114 of a first WBAG 18 may be placed on the first assembly panel 14 of the fabrication table 12. At this stage of the assembly method, the fabrication table 12 may be oriented as shown in FIGS. 1 and 2, in which the first assembly panel 14 is facing upwardly and the second assembly panel 16 is facing downwardly.

The transport tool 54 may be spaced away from, and not nested with, the fabrication table 12 at this stage of the assembly process.

Figure 9:
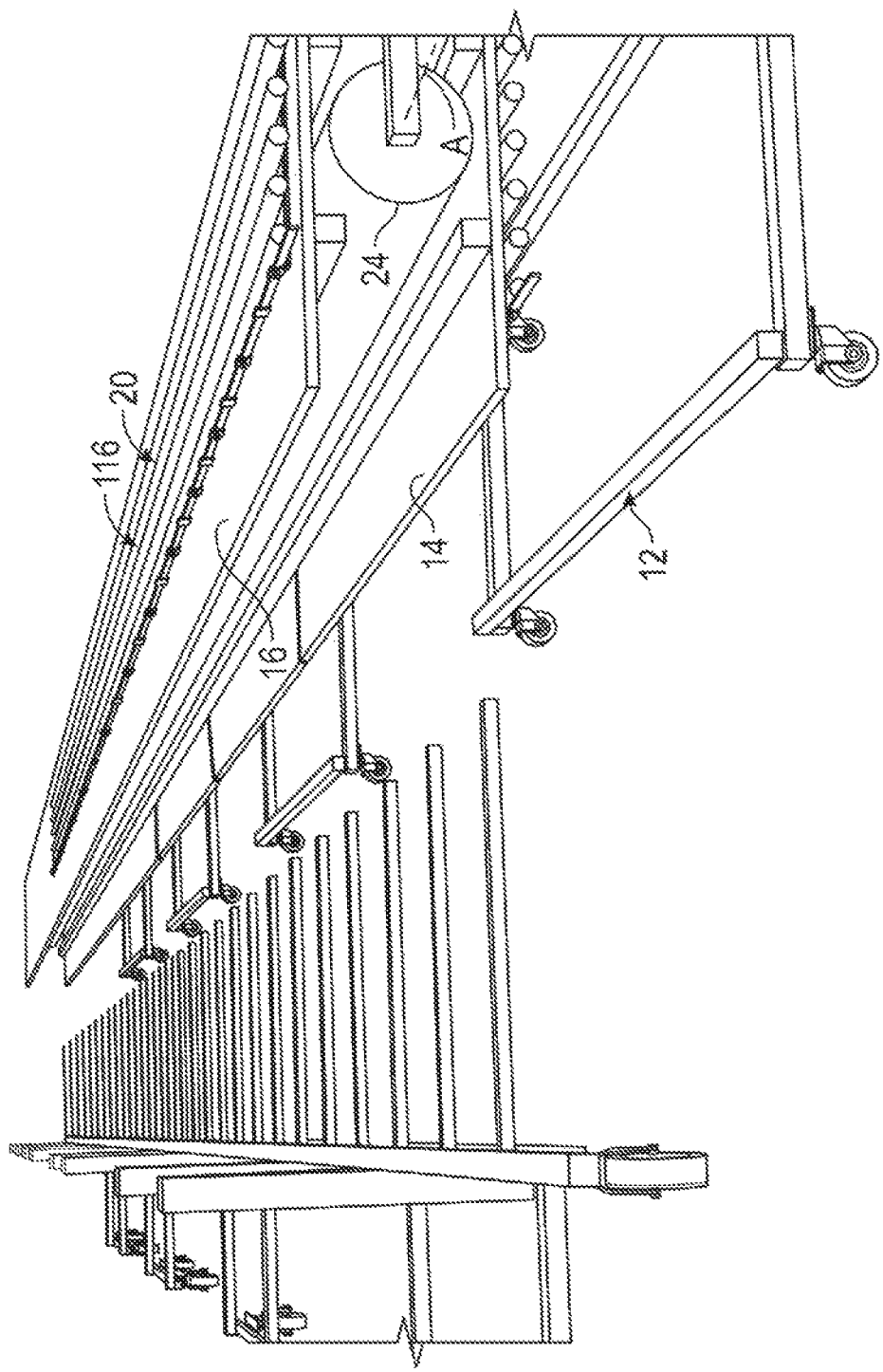
FIG. 9 is a diagrammatic representation of a perspective view of the fabrication table and transport frame of FIG. 8, in which the fabrication table carries first and second WBAGS.

The first WBAG 18 may be assembled from the first grouping of components 114 and may be attached to the first assembly panel 14 by means such as zip or cable ties, and/or retained against the first assembly panel by one or a plurality of retention bars 34 (see FIGS. 1 and 2). The pivot 24 may be actuated to rotate the first assembly panel 14 about the longitudinal axis A. Preferably, the adjustable pivot 24 rotates the first assembly panel 14 to the position shown in FIG. 9, at which time the second assembly panel 16 may be facing upwardly and the first assembly panel 14 facing downwardly. The second assembly panel 16 faces upwardly, or substantially upwardly, so that the assemblers may place a second grouping of components 116 of the second WBAG 20 on the second assembly panel, and assemble the second WBAG from the second grouping of components. The WBAG 20 may be attached to the second assembly panel 16 by conventional means such as zip or cable ties, and/or retained against the second assembly panel 16 by one or a plurality of retention bars 35 (see FIGS. 1 and 2).

As shown in FIG. 10, at this time, the transport tool 54 may be moved into the nested relation with the fabrication table 12, such that the support rods 64 of the WBAG receiving panel 56 may be directly beneath the first assembly panel 14 and the now-completed first WBAG 18. The first WBAG 18 may be released from the first assembly panel 14 by, for example, cutting the zip or cable ties and/or removing the retention bars 34 (see FIGS. 1 and 2), and allowed to fall downwardly onto the WBAG receiving panel 56. The first WBAG 18 may then be attached to the support rods 64 of the WBAG receiving panel 56, and may be retained on the support rods 64 by retention bars 76 (see FIGS. 3 and 4). In an embodiment, the transfer of the first WBAG 18 from the first assembly panel 14 to the support rods 64 may be performed simultaneously, or substantially simultaneously, with the placement of the second grouping of components 116 (see FIG. 9) of the second WBAG 20 on the second assembly panel 16.

Figure 11:
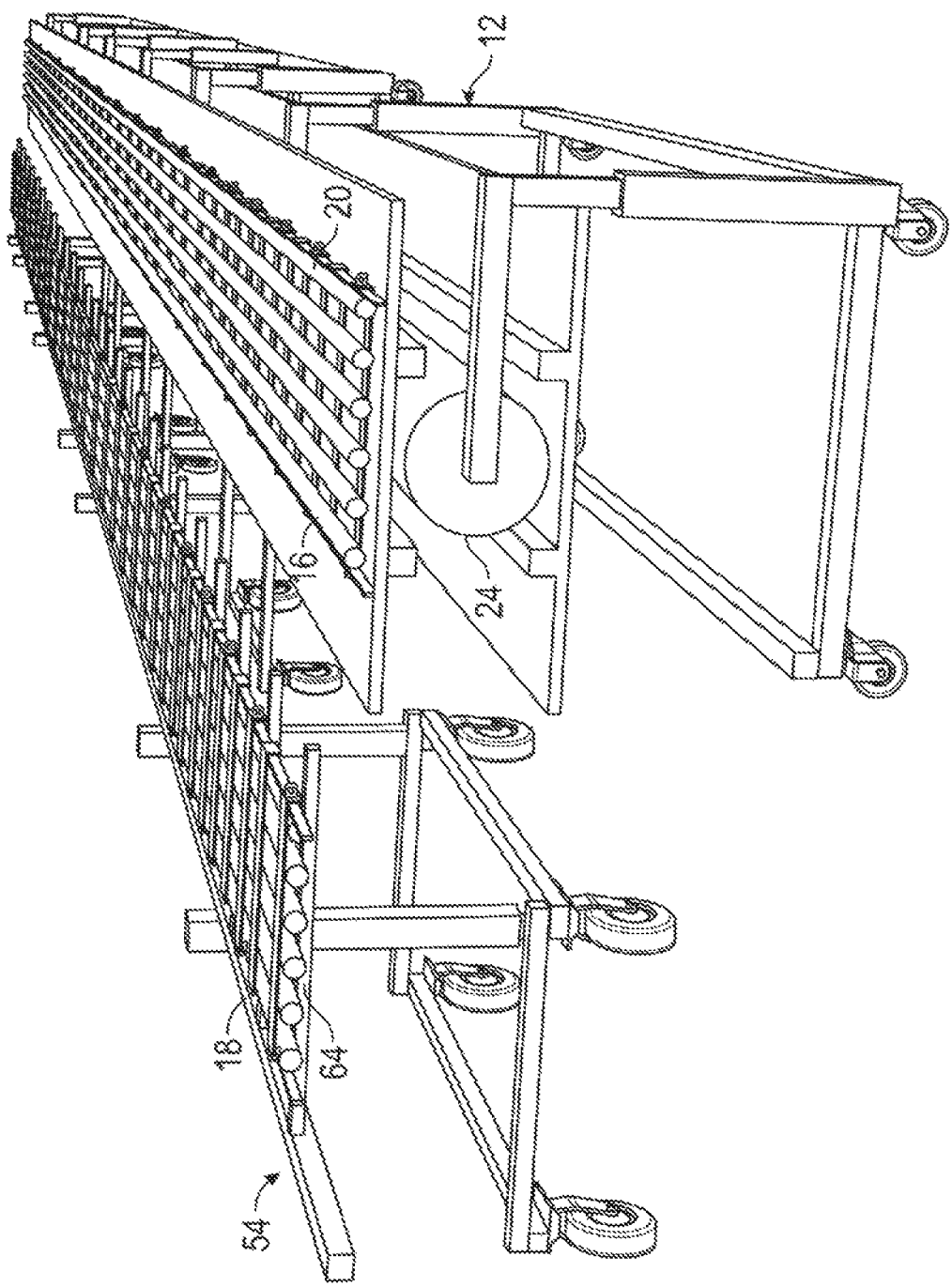
FIG. 11 is a diagrammatic representation of a perspective view of the system of FIG. 8, in which the first WBAG is supported on the transport frame adjacent the fabrication table.

As shown in FIG. 11, the transport tool 54, which now supports the first WBAG 18, may be moved sidewardly away from the fabrication table 12, which still carries the second WBAG 20 on the second assembly panel 16. In embodiments, the assembly of the second WBAG 20 may require more time, and during this additional time, the transport tool 54 may transport the completed WBAG 18 to an installation location, or to a transport vehicle (not shown) for transport to the installation location. This process is repeated for the second WBAG 20. Specifically, the second WBAG 20 is assembled on the second assembly panel 16, the adjustable pivot 24 is actuated to rotate the second assembly panel 16 to the position shown in FIG. 8, only this time it carries the second WBAG 20 and the second WBAG is released to fall downwardly on the support rods 64 of a next subsequent transport tool 54.

Figure 12:
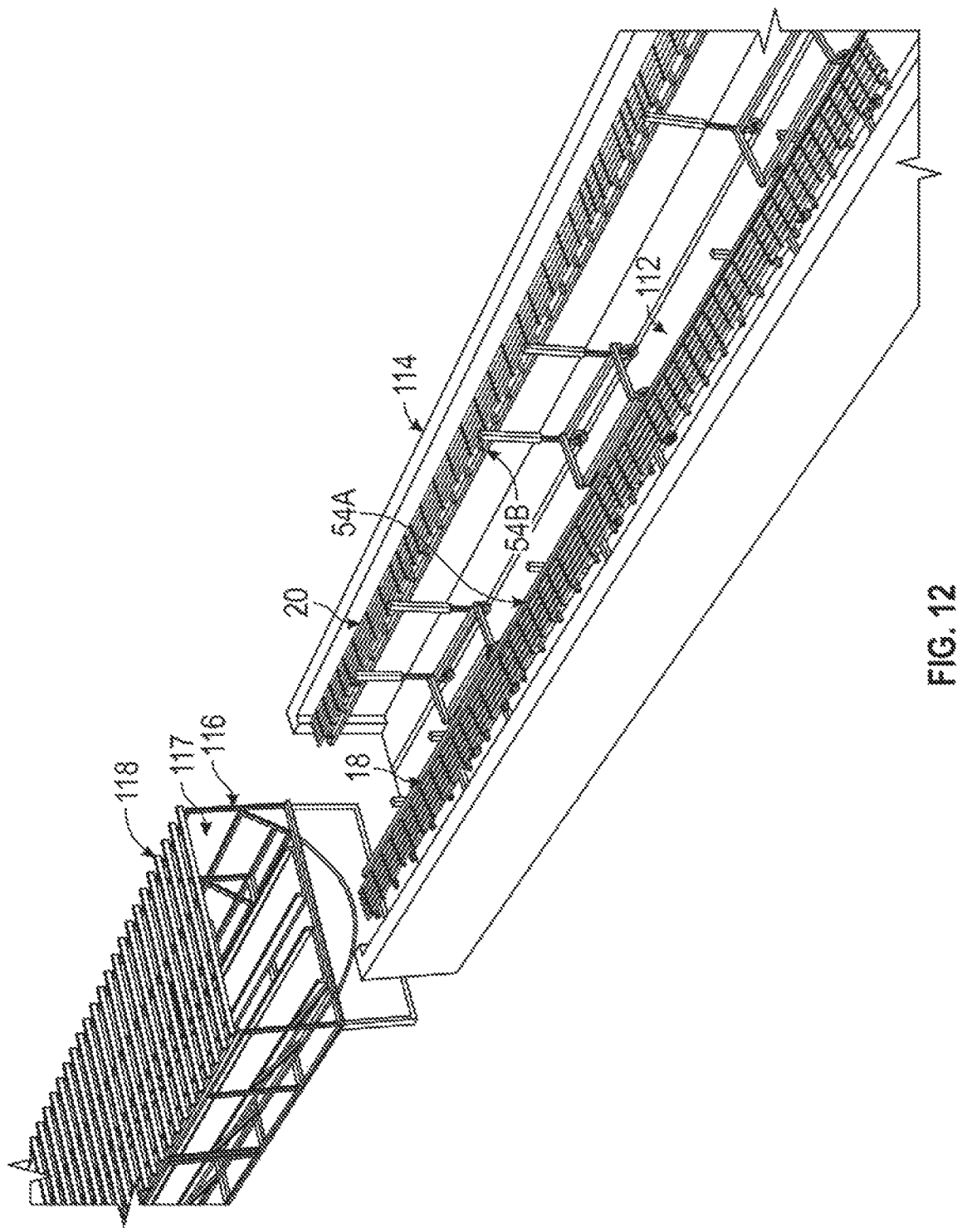
FIG. 12 is a diagrammatic representation of a perspective view of the system of FIG. 8, in which the transport tool is supported on a lift adjacent an aircraft fuselage.

As shown in FIG. 12, the transport tools 54A, 54B, which support first WBAG 18 and second WBAG 20, respectively, are loaded onto the bed 112 of a transport vehicle 114. In an embodiment, the transport tools 54A, 54B simply may be rolled onto the bed 112 of the transport vehicle 114, or the transport tools 54A, 54B, may engage tracks (not shown) formed in the bed of the transport vehicle. Preliminarily, the transport tools 54A, 54B first may be rolled into the trailer of a standard tractor-trailer and driven to the installation location, where there would be off-loaded onto the bed 112 of the transport vehicle 114. The transport vehicle 114 may then be conveyed to the installation site, where it may be aligned with an open end 116 of the cargo bay 117 of an aircraft fuselage 118 in which the first and second WBAG 18, 20 are to be installed.

Figure 13:
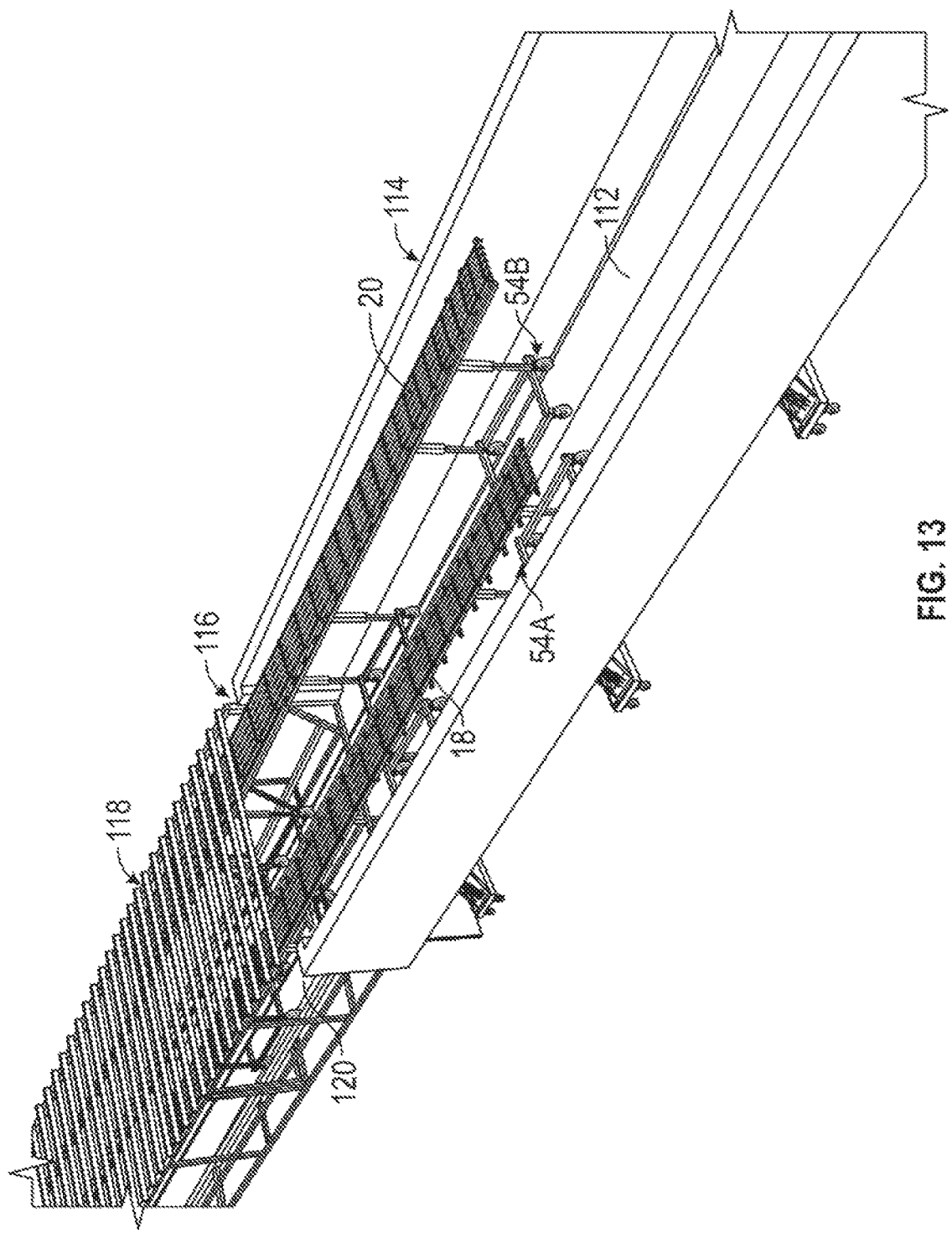
FIG. 13 is a diagrammatic representation of a perspective view of the transport tool of FIG. 8, partially inserted into the aircraft fuselage from the lift device.

As shown in FIG. 13, the bed 112 of the transport vehicle 114 may be raised to be aligned with the open end 116 of the aircraft fuselage 118 under construction. In an embodiment, the bed 112 may be raised to a point at which it is level, or substantially level, with a temporary floor 120 in the aircraft fuselage 118. When so aligned, as shown in FIG. 13, the transport tools 54A, 54B, carrying the completed first and second WBAGs 18, 20, may be rolled into the aircraft fuselage 118 through the open end 116.

Figure 14:
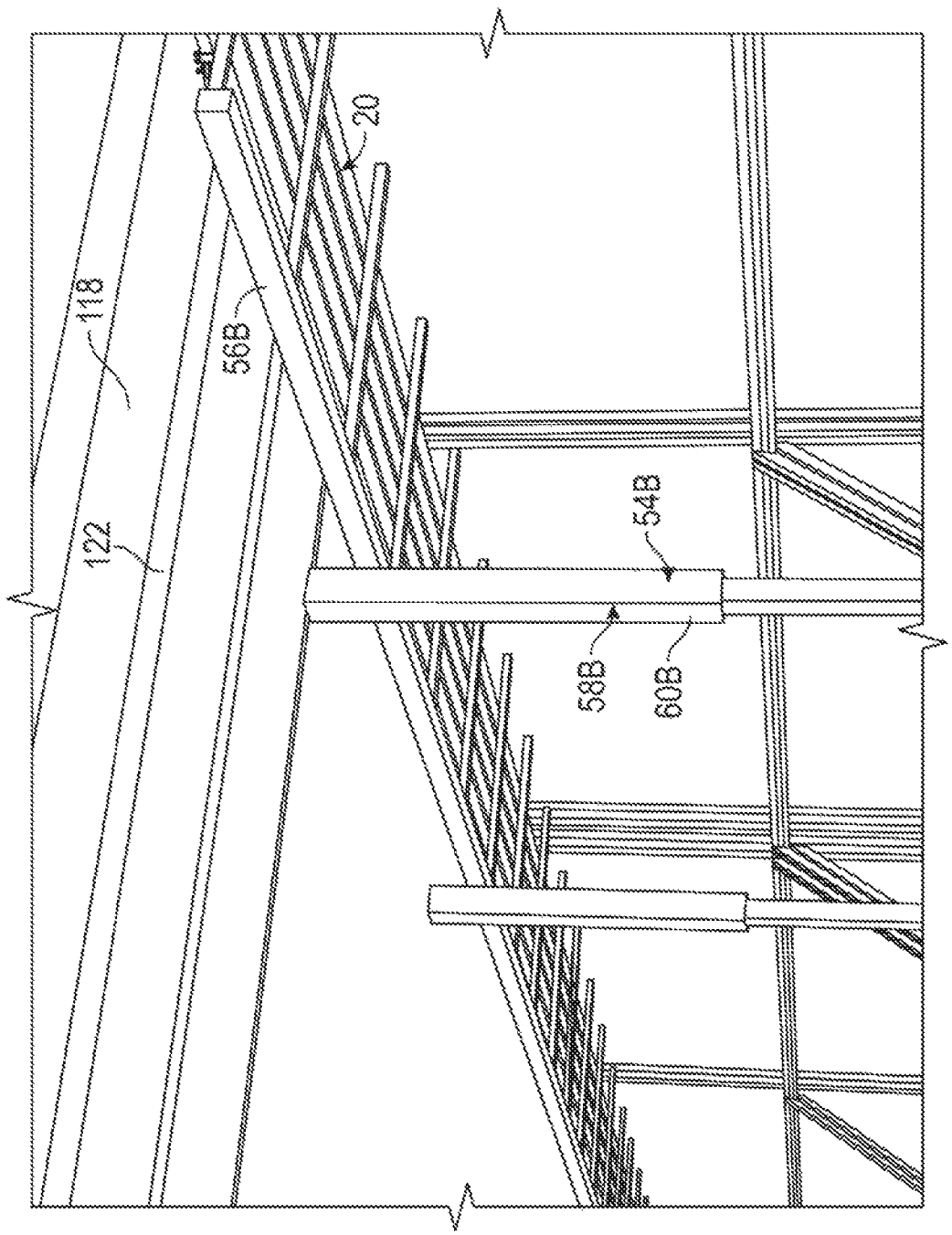
FIG. 14 is a diagrammatic representation of a perspective view of the transport tool of FIG. 8, in which the transport tool is adjacent the attachment area within the aircraft fuselage.

As shown in FIG. 14, once the transport tools 54A (not shown in FIG. 14) and 54B may be moved and positioned within the cargo bay of the aircraft fuselage 118, the adjustable supports 60B of the transport frame 58B may be actuated to raise the WBAG receiving panel 56B upwardly to position the second WBAG 20 thereon immediately below and adjacent the floor beams 122 of the aircraft fuselage 118. At this time, the installers may remove any restraints holding the WBAG 20 to the WBAG receiving panel 56B, such as zip or cable ties and/or retention bars 76 (see FIGS. 3 and 4), and attach the second WBAG 20 to the floor beams 122. After the WBAG 20 is attached to the floor beams 122, which may be by spanner bars (not shown), the adjustable support 60B may be actuated so that the WBAG receiving panel 56B may be lowered downwardly from the floor beams 122 to provide clearance.

Figure 15:
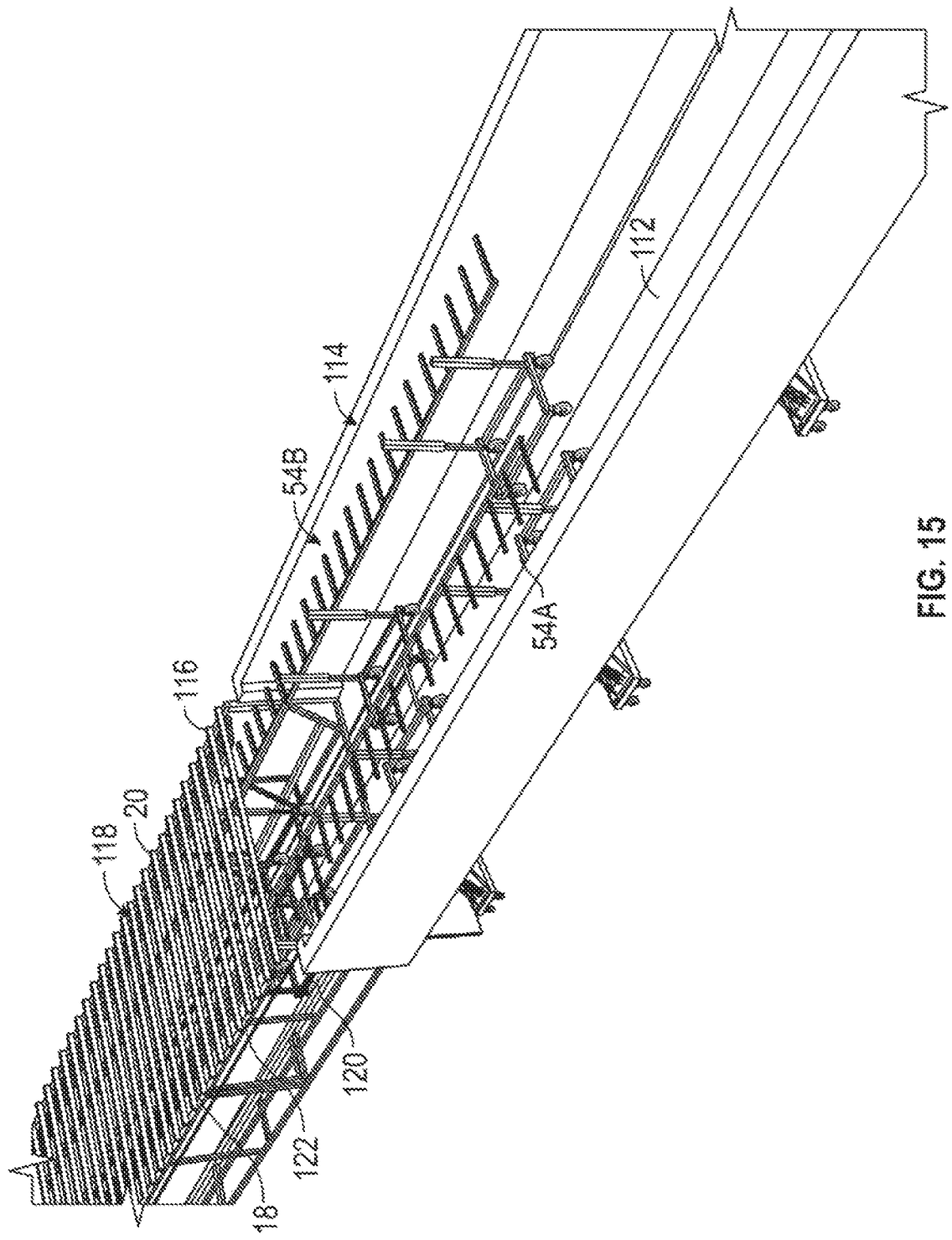
FIG. 15 is a diagrammatic representation of a perspective view of the transport tool of FIG. 8 being displaced out of the aircraft fuselage after the WBAGs have been attached to the fuselage.

Although not shown, the same procedure may be performed with respect to the transport tool 54A to install the first WBAG 18 to the floor beams 122 of the aircraft fuselage 118. As shown in FIGS. 14 and 15, once both the first WBAG 18 and second WBAG 20 are installed by attachment to the floor beams 122 of the aircraft fuselage 118, the transport tools 54A, 54B may be removed from the aircraft fuselage 118 by rolling them through the open end 116 of the cargo bay and onto the bed 112 of the transport vehicle 114, which has been aligned with the temporary floor 120 within the cargo bay.

Figure 16:
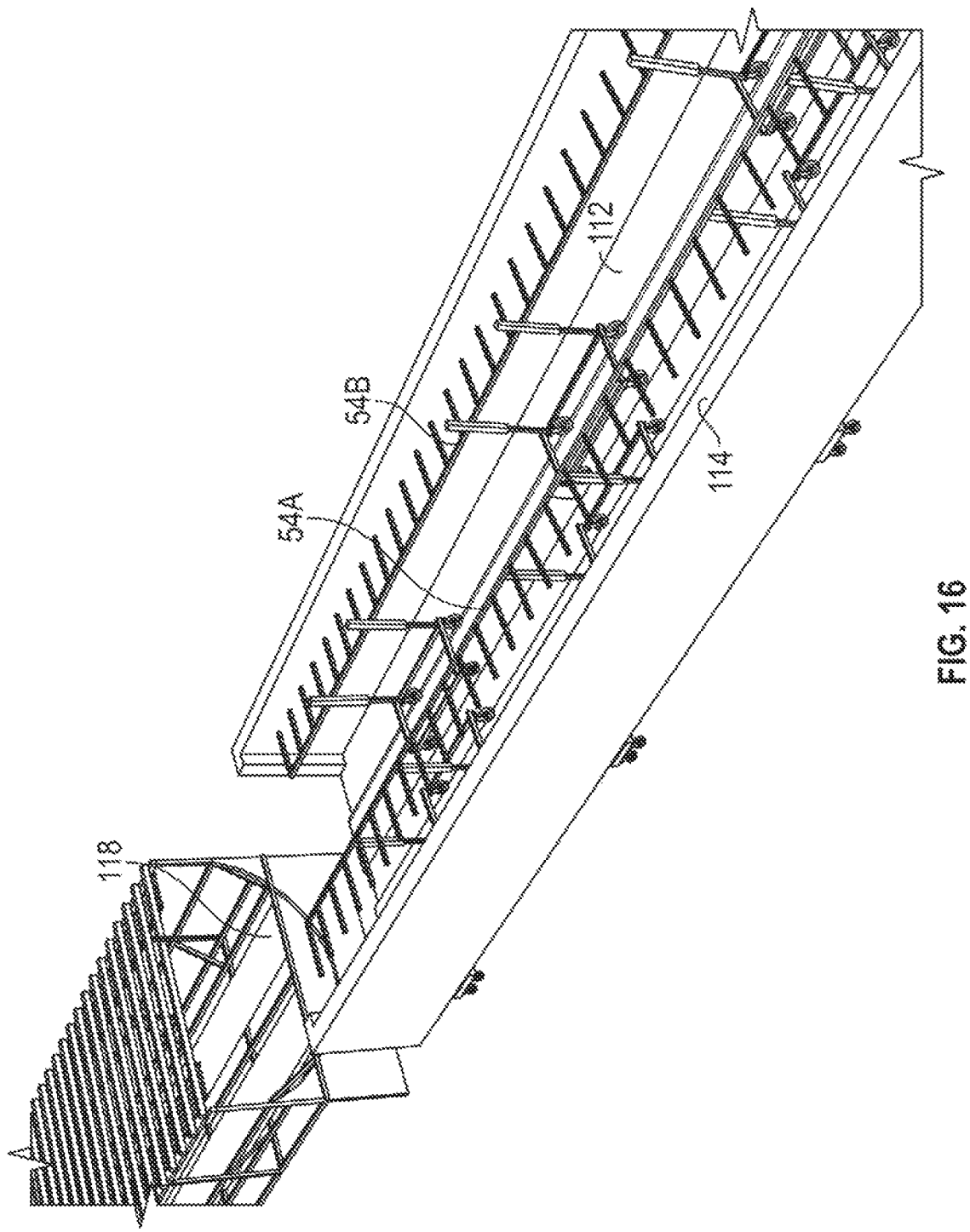
FIG. 16 is a diagrammatic representation of a perspective view of the transport tool of FIG. 8 completely displaced from the aircraft fuselage on the lift device.

As shown in FIG. 16, once the transport tools 54A, 54B have been displaced entirely upon the bed 112 of the transport vehicle 114, and secured into position, the transport vehicle may be lowered away from the aircraft fuselage 118 and the transport tools returned to the place of assembly.

The method and system described herein provide a palletized raceway for the rapid assembly and assembly, transportation and installation of WBAGS within an aircraft. This method and system reduce the manual labor needed, both in terms of the number of installers and the hours of labor per installer, to transport and install a WBAG in an aircraft or other vehicle.

Although not shown, an installation method that utilizes the transport tool 54' shown in FIGS. 5, 6 and 7 is similar to that described above. For example, the adjustable support 60' may be lowered so that the first and second racks 78, 80 may be placed in the open position shown in FIG. 7, at which time the first and second WBAGs 18, 20 may be picked up from the fabrication table and restrained to the transportation tool 54' first and second racks 78, 80 by retention bars 100, 104 or spanner bar provisions 102, 106. After assembly and attachment of the WBAGs 18, 20 to their respective racks 78, 80, respectively, the racks may be pivoted in the direction of arrows B, C to the closed position shown in FIG. 5, at which time they are directly above and superposed to the support plate 86 of the transport tool 54'. The adjustable supports 60' may be actuated to lower the support pate 86 and first and second racks 78, 80, wherein the transport tool 54' may be wheeled onto the bed 112 of the transport vehicle 114 (see FIG. 12).

When the transport vehicle 114 aligns the bed 112 with the temporary flooring 120 of the aircraft fuselage 118 where the WBAGs 18, 20 are to be installed (see FIG. 13), the transport tool 54' may be wheeled into the open end 116 (see FIG. 13) of the cargo bay, and the slides 88, 90 actuated to position the first and second racks 78, 80 to the desired locations with respect to the floor beams 122 (see FIG. 14). The actuators 82 of the adjustable supports 60' may be actuated to raise the first and second racks 78, 80 to a position just below the floorbeams 122 of the aircraft fuselage 118 (see FIG. 14). At that time, the first and second WBAGs 18, 20 may be attached to the floor beams 122 (see FIG. 14) by conventional means.

After the WBAG 18, 20 have been attached to the floor beams 122 (see FIG. 15), the adjustable supports 60' may be actuated to lower first and second racks 78, 80 to provide clearance below the floorbeams. The transport tool 54' then may be wheeled out of the fuselage 118 and back onto the bed 112 of the transport vehicle 114 (see FIG. 16), where it may be transported back to the place of assembly.

While forms of apparatus and methods of the disclosed system and method for assembling and installing a WBAG are described herein, it is to be understood that the scope of the disclosure is not limited to these precise systems and methods, and that changes may be made therein without the departing from the scopes of the disclosure and claims.

What is claimed is:

1. A method for assembling and installing a wire bundle assembly group (WBAG), the method comprising:
   placing a first grouping of components of a first WBAG on a first assembly panel of a fabrication table, the first WBAG is comprised of one or more first electrical wires;
   assembling the first WBAG from the first grouping of components and attaching the first WBAG to the first assembly panel;
   actuating a pivot of an assembly frame supporting the first assembly panel to rotate the first assembly panel about a longitudinal axis;
   placing a WBAG receiving panel of a transport tool adjacent the first WBAG and the first assembly panel;
   releasing the first WBAG from the first assembly panel and dropping the first WBAG onto the WBAG receiving panel; and
   attaching the first WBAG to the WBAG receiving panel.

2. The method of claim 1, wherein actuating the pivot of the assembly frame further includes:
   presenting, to a WBAG assembler, a second assembly panel supported by the pivot.

3. The method of claim 2, the method further comprising:
   placing a second grouping of components of a second WBAG on the second assembly panel, the second WBAG is comprised of one or more second electrical wires;
   assembling the second WBAG from the second grouping of components; and
   attaching the second WBAG to the second assembly panel.

4. The method of claim 3, wherein placing the second grouping of components of the second WBAG on the second assembly panel, and assembling the second WBAG from the second grouping of components are performed substantially simultaneously with placing the WBAG receiving panel of the transport tool adjacent the first WBAG and the first assembly panel, releasing the first WBAG from the first assembly panel such that the first WBAG drops onto the WBAG receiving panel, and attaching the first WBAG to the WBAG receiving panel.

5. The method of claim 3, wherein the fabrication table includes a bundle-retaining element including a plurality of retention bars releasably attached to the first assembly panel and the second assembly panel, the method further comprising:
   capturing the first WBAG between at least one of the plurality of retention bars and the first assembly panel; and
   capturing the second WBAG between at least one of the plurality of retention bars and the second assembly panel.

6. The method of claim 5, wherein the first assembly panel has a first radially outer WBAG supporting surface and the second assembly panel has a second radially outer WBAG supporting surface, the method further comprising:
   having one of the first WBAG supporting surface and the second WBAG supporting surface facing upwardly and the other one of the first WBAG supporting surface and the second WBAG supporting surface facing downwardly.

7. The method of claim 2, further comprising moving the transport tool with the first WBAG to an installation location.

8. The method of claim 2, wherein presenting, to the WBAG assembler, the second assembly panel supported by the pivot further includes:
   actuating the pivot to substantially superpose the second assembly panel to the first assembly panel.

9. The method of claim 2, wherein the first assembly panel defines a first WBAG supporting surface that receives and supports the first WBAG and the second assembly panel defines a second WBAG supporting surface that receives and supports a second WBAG, the method further comprising:
   rotating both the first assembly panel and the second assembly panel about the longitudinal axis by the pivot, wherein the longitudinal axis is parallel to a longitudinal dimension of the first assembly panel and the second assembly panel;
   orienting the first WBAG supporting surface to face upwardly and the second WBAG supporting surface to face downwardly; and
   orienting the second WBAG supporting surface to face upwardly and the first WBAG supporting surface to face downwardly.

10. The method of claim 2, wherein the transport tool further comprises a transport frame having an adjustable support connected to the WBAG receiving panel, and the method further comprises:
    positioning the transport frame adjacent the fabrication table;
    locating the WBAG receiving panel beneath the first assembly panel and the second assembly panel; and
    dropping an assembled WBAG of at least the first WBAG or the second WBAG downwardly onto the WBAG receiving panel.

11. The method of claim 2, further comprising: holding the first assembly panel and the second assembly panel substantially parallel to each other by the assembly frame;
    superimposing the first assembly panel to the second assembly panel by the pivot; and
    superimposing the second assembly panel to the first assembly panel by the pivot.

12. The method of claim 2, wherein the pivot further includes a central shaft rotated by an actuator, the method further comprising:
selectively rotating, by the central shaft, the first assembly panel and the second assembly panel at least 180° about the longitudinal axis.

13. The method of claim 1, further comprising:
nesting the transport tool beneath the fabrication table.

14. The method of claim 1, wherein the WBAG receiving panel includes a rail and a plurality of support rods, the method further comprising:
supporting, by the plurality of support rods, at least one of the first WBAG or the second WBAG received from the fabrication table.

15. The method of claim 14, wherein the transport tool includes a plurality of adjustable supports connected to the rail.

16. The method of claim 15, wherein the transport tool includes at least one actuator, the method further comprising:
raising and lowering the WBAG receiving panel relative to a remainder of the transport tool by the at least one actuator.

17. A method for assembling and installing a wire bundle assembly group (WBAG), the method comprising:
receiving and supporting a first WBAG on a first assembly panel, the first WBAG is comprised of one or more first electrical wires;
receiving and supporting a second WBAG on a second assembly panel, the second WBAG is comprised of one or more second electrical wires, wherein the first WBAG, the first assembly panel, the second WBAG, and the second assembly panel are part of a fabrication table, the first assembly panel is interconnected to the second assembly panel by an adjustable pivot of an assembly frame, and the first assembly panel and the second assembly panel are in a spaced orientation relative to each other and are pivotable about an axis parallel to a longitudinal dimension of the first assembly panel and the second assembly panel;
positioning a transport tool adjacent the fabrication table to locate a WBAG receiving panel of the transport tool beneath at least one of the first assembly panel and the second assembly panel; and
dropping one of the first WBAG and the second WBAG downwardly onto the WBAG receiving panel respectively from the first assembly panel and the second assembly panel.

18. The method of claim 17, wherein the WBAG receiving panel includes a first rack and a second rack, a support plate, and a first slide and a second slide, the first slide and the second slide are mounted on the support plate and are respectively attached to the first rack and the second rack respectively by a first pivot and a second pivot, the method further comprising:
pivoting the first rack and the second rack between open and closed positions on the support plate; and
moving the first rack and the second rack towards and away from each other.

19. The method of claim 18, further comprising:
selectively raising and lowering the WBAG receiving panel using at least one actuator.

20. The method of claim 18, wherein the first pivot and the second pivot respectively include a first actuator and a second actuator, the method further comprising:
pivoting the first rack by the first actuator; and
pivoting the second rack by the second actuator.

* * * * *